Feb. 20, 1962     W. F. STEAGALL     3,022,007
SERIAL BINARY ADDER

Filed Nov. 26, 1954     4 Sheets-Sheet 1

INVENTOR
WILLIAM F. STEAGALL

BY *Ejerry Light*

ATTORNEY

Feb. 20, 1962 W. F. STEAGALL 3,022,007
SERIAL BINARY ADDER
Filed Nov. 26, 1954 4 Sheets-Sheet 2

LEGEND

INVENTOR
WILLIAM F. STEAGALL

BY
*Ejenylight*
ATTORNEY

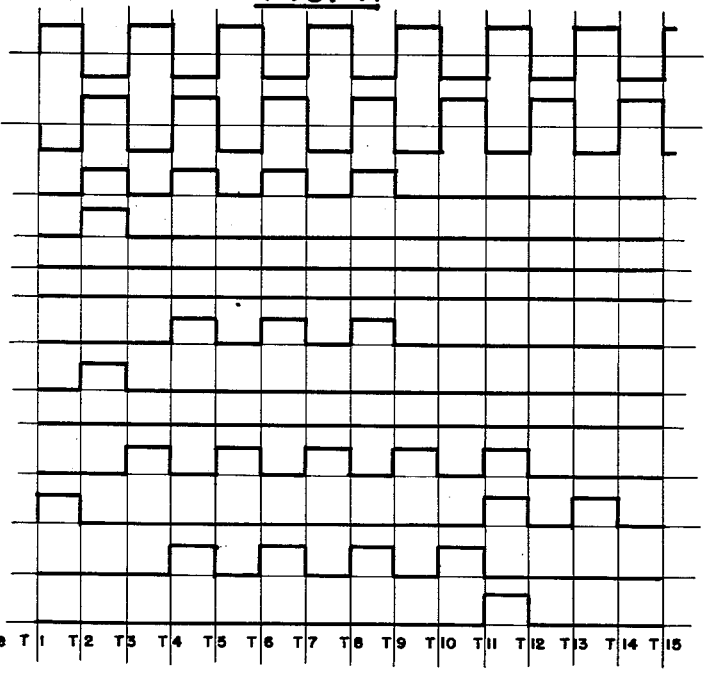

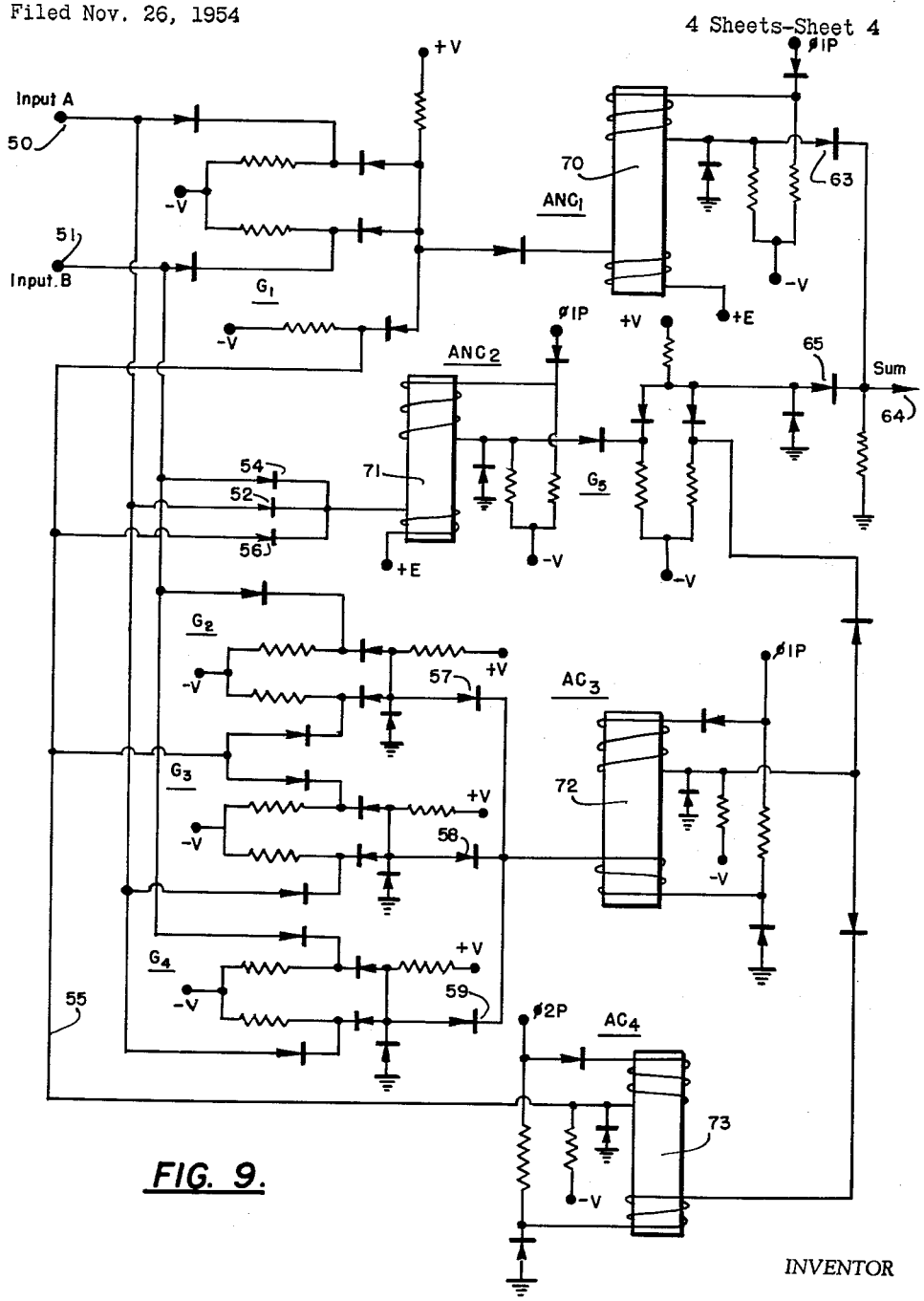

United States Patent Office 3,022,007
Patented Feb. 20, 1962

3,022,007
SERIAL BINARY ADDER
William F. Steagall, Merchantville, N.J., assignor to Sperry Rand Corporation, a corporation of Delaware
Filed Nov. 26, 1954, Ser. No. 471,231
12 Claims. (Cl. 235—176)

The present invention relates to computing apparatuses, and is more particularly concerned with devices capable of performing serial addition in binary digital applications. In particular, the present invention relates to the provision of serial adders for binary digital applications utilizing magnetic amplifiers, preferably of the pulse type.

The process known as serial addition of binary numbers is well known in the computing art and units capable of performing such serial binary addition ordinarily comprise a basic portion of more complex computation devices. In the past, such serial adders for binary numbers have employed vacuum tube circuitry for the most part and have accordingly been subject to the disadvantages that they are relatively large in size, fragile in configuration and are subject to operating failures. These factors raise serious questions of disposition of components and problems of maintenance. The present invention serves to obviate the foregoing difficulties and in essence provides a serial adder structure capable of performing full addition of binary numbers and utilizing magnetic amplifiers as the basic portion thereof.

It is accordingly an object of the present invention to provide an improved serial adder for use in computing applications.

A further object of the present invention resides in the provision of a binary adder which employs fewer amplifier stages than has been the case in the past.

Still another object of the present invention resides in the provision of an improved serial adder which is more rugged in construction and which is less subject to operating failures than previously.

A still further object of the present invention resides in the provision of an improved serial adder for binary digital applications employing magnetic amplifiers as components thereof.

Another object of the present invention is the provision of a serial adder for binary numbers which adder can be made in relatively small sizes.

A still further object of the present invention resides in the provision of a computation device comprising, in combination, a plurality of magnetic amplifiers and a plurality of gating devices so interconnected with one another that the mathematical process known as serial binary addition may be performed electrically.

In providing for the foregoing objects and advantages, the present invention utilizes a plurality of magnetic amplifiers interconnected with a plurality of permissive gates. In the particular embodiment of my invention to be described subsequently, a binary adder employing magnetic amplifiers and adapted to perform serial addition of two trains of binary digits will be described, and it is to be understood that the principles set forth may be applied in the provision of a serial binary adder capable of performing serial addition of trains containing any desired number of binary digits. The binary adder of the present invention includes provision for selectively coupling the input trains of pulses to be added as well as carry pulses produced by the device itself to the plurality of gates mentioned previously, and the gates are themselves adapted to selectively pass signal pulses required for the operation or inhibition of the plurality of magnetic amplifiers mentioned above.

Before proceeding with a detailed description of my invention, several definitions of the subject matter to be discussed are advisable. In the practice of my invention, I utilize both complementing and non-complementing magnetic amplifiers. A complementing magnetic amplifier is, by definition, one which will give an output when no input is presented thereto, or on the contrary, one which will give no output when there is in fact an input. Again, by definition, a non-complementing amplifier is one which will give an output only when an input is presented thereto.

The several amplifiers comprising the serial adders of my invention are energized by "power pulses." These pulses are preferably in the form of regularly occurring positive and negative going square waves. In the precise disposition of components, some amplifiers will be fed by "phase 1 power pulses" and this term merely refers to such positive and negative going square waves timed with respect to an arbitrary datum. Other of the amplifiers will utilize "phase 2 power pulses" and it is to be understood that this latter term again refers to pulses of the same form as phase 1 power pulses timed again with respect to the same arbitrary datum, but so displaced with respect to said datum that a positive going portion of a phase 1 power pulse will coincide with a negative going portion of a phase 2 power pulse and vice versa. Again, it will become apparent from the following description that the several power pulses cooperate with input pulses to selectively produce or inhibit an output from the magnetic amplifier concerned. These input pulses must ordinarily occur during a negative going portion of the corresponding power pulse applied to the said amplifier (or during a positive going power pulse portion, if the power winding diode is reversely connected) and in this respect therefore when I speak of a "phase 1 input pulse" it is to be understood that this term refers to an input pulse capable of cooperating with a magnetic amplifier energized by phase 1 power pulses. Similarly, a "phase 2 input pulse" is one capable of cooperating with a magnetic amplifier energized by phase 2 power pulses. A phase 1 input pulse cannot effectively cooperate with a phase 2 power pulse, nor can a phase 2 input pulse effectively cooperate with a phase 1 power pulse.

The foregoing objects, advantages and operation of my invention will become more readily apparent from the following description and accompanying drawings, in which:

FIGURE 7 (A through M inclusive) are waveforms illustrating the operation of the serial adder shown in FIGURE 6 for the addition of binary numbers in accordance with a first example of the operation of my invention.

FIGURE 8 (A through M inclusive) are waveforms, illustrating the operation of the serial adder shown in FIGURE 6 for the addition of binary numbers in accordance with a second example of the operation of my invention; and FIGURE 9 is a schematic diagram illustrative of one possible circuit in accordance with the logic of FIGURE 6.

Figure 1:
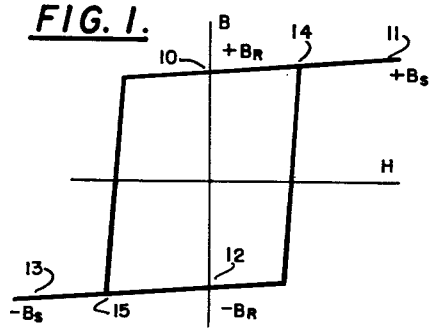
FIGURE 1 is an idealized hysteresis loop of a magnetic material which may preferably be employed in the cores of the magnetic amplifiers utilized in my invention.

Referring now to FIGURE 1, it will be seen that the magnetic amplifiers of my invention may preferably, but not necessarily, utilize magnetic cores exhibiting a substantially rectangular hysteresis loop. Such cores may be made of a variety of materials, among which are various types of ferrites and various kinds of magnetic tapes including Orthonik and 4-79 Moly-Permalloy. These materials may be given different heat treatments to effect different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores, nor to any specific materials therefor; and the examples to be given are illustrative only.

In the following description bar type cores have been utilized for ease of representation and for facility in showing winding directions. The bar type cores shown may in fact be considered to represent the end view of a toroidal core. Further, the following description refers to the use of materials having substantially rectangular hysteresis loops. However, this is again for ease of discussion. However, neither the precise core configuration nor the precise hysteretic character of core material is mandatory; and many variations will readily suggest themselves to those skilled in the art.

Returning now to the hysteresis loop shown in FIGURE 1, it will be noted that the curve exhibits several significant points of operation, namely, point 10 ($+Br$) which represents a point of plus remanence; the point 11 ($+Bs$) which represents plus saturation; the point 12 ($-Br$) which represents minus remanence; the point 13 ($-Bs$) which represents minus saturation; the point 14 which represents the beginning of the plus saturation region; and the point 15 which represents the beginning of the minus saturation region.

Discussing for the moment the operation of the device utilizing a core which exhibits a hysteresis loop such as is shown in FIGURE 1, let us assume that a coil is wound on the said core. If we should initially assume that the core is at an operating point 10 (plus remanence), and if a voltage pulse is applied to the coil which produces in the said coil a current creating a magnetomotive force in a direction tending to increase the flux in the said core (i.e. in a direction of $+H$), the core will tend to be driven from point 10 ($+Br$) to point 11 ($+Bs$). During this state of operation there is relatively little flux change through the said coil and the coil therefore presents a relatively low impedance whereby energy fed to the said coil during this state of operation will pass readily therethrough and may be utilized to effect a usable output.

Figure 4:
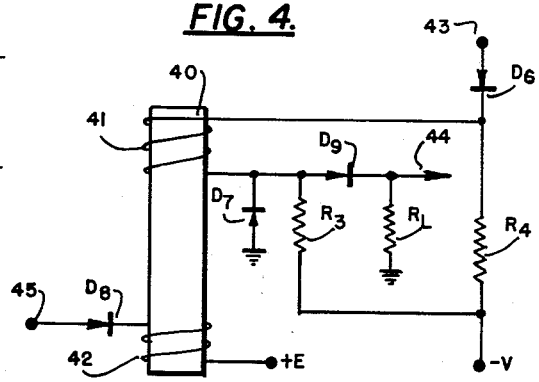
FIGURE 4 is a schematic representation of a simple non-complementing amplifier of the magnetic type.

On the other hand, if the core should initially be at point 12 ($-Br$) prior to the application of the said $+H$ pulse, upon application of such a pulse the core will tend to be driven from the said point 12 ($-Br$) to the region of plus saturation. The pulse magnitude should preferably be so selected that the core is driven only to the beginning of the plus saturation region, point 14. During this particular state of operation, there is a very large flux change through the said coil and the coil therefore exhibits a relatively high impedance to the applied pulse. As a result substantially all the energy applied to the coil, when the core is initially at $-Br$, will be expended in "flipping" the core from point 12 to the region of plus saturation (preferably to point 14), and thence to point 10, with very little of this energy actually passing through the said coil to give a usable output. Thus, depending upon whether the core is initially at point 10 ($+Br$), or at point 12 ($-Br$), an applied pulse in the $+H$ direction will be presented respectively with either a low impedance or a high impedance, and will effect either a relatively large output or a relatively small output. These considerations are of great value in the construction of the magnetic amplifiers utilized in the present invention, such as are shown in FIGURES 2 and 4.

Figure 2:
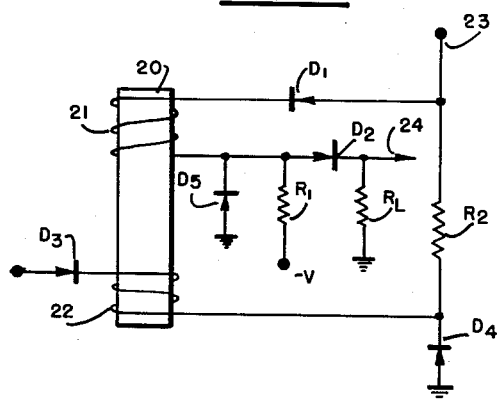
FIGURE 2 is a schematic representation of a simple complementing amplifier of the magnetic type.
Figure 3:
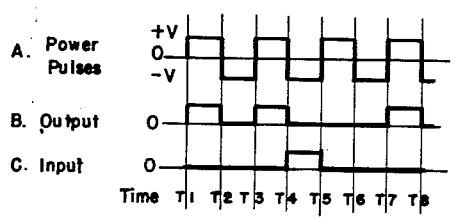
FIGURE 3 (A, B and C) are waveforms illustrating the operation of the complementing magnetic amplifier shown in FIGURE 2.

Referring now to FIGURES 2 and 3, it will be seen that a complementing magnetic amplifier, provided in accordance with the present invention, comprises a core 20 preferably but not necessarily exhibiting a hysteresis loop similar to that discussed in reference to FIGURE 1. The core 20 bears two windings thereon, namely, a winding 21 which is termed the power or output winding, and a signal or input winding 22. One end of the power winding 21 is coupled to a diode D1 poled as shown and the diode D1 is in turn connected to an input terminal 23 supplied with a train of positive and negative going power pulses such as is shown in FIGURE 3A. The power pulses shown preferably but not necessarily have a center value of "0" volts and exhibit excursions between $+V$ and $-V$ volts. Assuming now that the core is initially at plus remanence (point 10 of FIGURE 1), a positive going power pulse applied at terminal 23 during the time $t1$ to $t2$ will cause current to pass through the diode D1, through the relatively low impedance exhibited by power winding 21 and thence through diode D2 and load resistor RL, to ground. Because of the low impedance exhibited by coil 21, a substantial output pulse will therefore appear at the terminal 24 during the time $t1$ to $t2$. At time $t2$, and in the absence of any signal input, the core will return to the operating point 10 (shown in FIGURE 1) and the next positive going power pulse applied during the time $t3$ to $t4$, for instance, will again drive the core to plus saturation, again giving an output during this time $t3$ to $t4$. Thus, in the absence of any other inputs, if the core 20 should initially be at plus remanence, successive positive going power pulses will cause successive outputs to appear at output terminal 24.

Let us now assume, however, that an input pulse is applied during the time $t4$ to $t5$, such as is shown in FIGURE 3C. This input pulse causes current to pass through the diode D3 and through coil 22 and, as will be noted from FIGURE 2, inasmuch as the said coil 22 is wound in a direction opposite to that of coil 21, the said input pulse will effect a $-H$ magnetizing force on the core 20. Thus, during the time $t4$ to $t5$, the application of an input pulse, as described, will cause the core 20 to be flipped in a counter-clockwise direction from the plus remanence point to the region of the minus remanence point (point 10 to point 15, to point 12 of FIGURE 1), and at time $t5$ the core 20 will find itself at the operating point 12, $-Br$, preparatory to the reception of the next positive going power pulse applied during the time $t5$ to $t6$. This next positive going power pulse will thus find the coil 21 to present a relatively high impedance and as a result substantially all of the energy presented by the power pulse will be expended in flipping the core back to the region of point 10 ($+Br$), via point 14, rather than in producing a usable output. Thus, as will be seen from an examination of FIGURE 3, the application of an input pulse during the occurrence of a negative going portion of the applied power pulses will effectively prevent the output of a usable pulse during the next succeeding positive going power pulse. The system thus acts as a complementer.

While the foregoing discussion has described in essence the operation of a complementing magnetic amplifier in accordance with the present invention, several further design considerations should be noted. First of all even though during the time $t5$ to $t6$, for instance, the energy in the positive going power pulse is expended in merely flipping the core from $-Br$ to $+Br$, a small output termed a sneak output may still appear across RL. Such sneak outputs are effectively suppressed by the combination of resistor R1 and diode D5 connected as shown in FIGURE 2. This suppression is effected by so choosing the magnitude of resistor R1 that a current flows through the said diode D5 and resistor R1 to a source of negative potential $-V$, which current is equal to or greater than the magnitude of the sneak pulse current to be suppressed. Because of the operation of diode D5 and resistor R1 therefore only outputs larger than that of the sneak output may appear at output terminal 24.

Again, the passage of energy through power winding 21 due to the application of a positive going power pulse at the terminal 23, will cause a flux change to occur in the coil 21 as described, and this flux change will in turn tend to induce a voltage in the signal coil 22. This induced voltage is negative at the cathode of D3 and positive at the cathode of D4, and although the induced voltage is small if the core 20 is at point 10 ($+Br$) when the positive going power pulse is applied, it is nevertheless necessary to prevent current from flowing in the signal winding 22 due to this small induced voltage. The combination of resistor R2 and diode D4 accomplishes this function by allowing the lower end of signal winding 22, connected to the junction of the said resistor R2 and diode D4, to attain the power pulse potential when the power pulse is positive. Since the base level of an input pulse, as applied through diode D3, is "0" volts, no current can now flow due to the small induced voltage discussed previously. Further, if the core 20 should initially be at $-Br$, upon application of a positive going power pulse a relatively large flux change occurs in the core and a relatively large voltage will be induced in the lower winding 22. The blocking action of the R2—D4 circuit still prevents current from flowing in the said lower winding 22 if there are fewer turns on signal winding 22 than are on power winding 21. It is well known in the art that this relationship between the number of turns on the windings must exist if a voltage gain is to be produced by the amplifier.

Finally, it should be noted that when a power pulse, such as is shown in FIGURE 3A, is negative going, only a negligible current can flow in diode D1. In this respect it has been assumed that the back resistance of the several diodes shown is infinite and that the forward resistance is zero. While this is not strictly true, these assumptions are convenient and do not substantially affect the explanation. Even though no current flows through the diode D1 during the application of a negative going portion of the power pulse, current flows in the R2—D4 circuit, the magnitude of this current being approximately $$\frac{V}{R2}$$

This current serves to hold the end of signal winding 22 connected to the junction of resistor R2 and diode D4 at approximately ground potential, and as a result, signal inputs applied through the diode D3 during a negative going power pulse portion pass through the said diode D3, through winding 22, as previously discussed, to the junction of resistor R2 and diode D4, which junction is approximately at ground potential. It should further be noted that the current which flows as a result of an input pulse through diode D3 must produce sufficient magnetizing force to flip core 20 from plus remanence to minus remanence during the input pulse period. This value of current must not exceed the magnitude $$\frac{V}{R2}$$

but this condition is easily arranged by proper choice of resistor R2.

Summarizing the foregoing briefly, it will be seen that the circuitry of FIGURE 2 provides a complementing magnetic amplifier wherein outputs will appear from the said amplifier so long as no input signal is presented thereto during negative going portions of the power pulses applied. Such a complementing magnetic amplifier may be utilized as a portion of the serial adders in accordance with several embodiments of the present invention. Before proceeding with the description of these serial adders, however, let us examine the construction and operation of a non-complementing magnetic amplifier such as may be utilized in the present invention.

Figure 5:
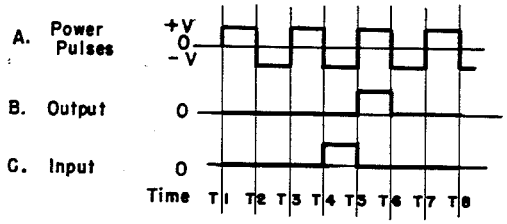
FIGURE 5 (A, B and C) are waveforms illustrating the operation of the non-complementing magnetic amplifier shown in FIGURE 4.

Referring now to the circuit shown in FIGURE 4, and making reference to the waveform diagrams of FIGURE 5 (A through C), it will be seen that a non-complementing amplifier in accordance with the present invention utilizes a magnetic core 40, again preferably but not necessarily exhibiting a hysteresis loop substantially the same as that shown in FIGURE 1. The core 40 again carries two windings thereon, namely, a power or output winding 41 and a signal or input winding 42. One end of the power winding 41 is coupled through a diode D6, poled as shown, to a source of position and negative going power pulses such as is shown in FIGURE 5A. For the purposes of the following discussion, the power pulses are again assumed to have a center value of "0" volts and to exhibit excursions between $+V$ and $-V$ volts. Assuming now that the core 40 is initially at $-Br$, point 12 of FIGURE 1, application of a positive going power pulse during the time $t1$ to $t2$, at power input terminal 43, will cause a current to flow through the diode D6 to winding 41 and thence through resistor R3 to the source of potential $-V$. Inasmuch as this energy is for the most part expended in flipping the core from $-Br$ (point 12 of FIGURE 1) to $+Br$ (point 10 of FIGURE 1), only a sneak output at best will appear across the load resistor RL, and this sneak output is again effectively suppressed by the combination of resistor R3 and diode D7, as was discussed in reference to FIGURE 2.

Thus, during the time $t1$ to $t2$ the applied positive going power pulse merely succeeds in flipping the core from $-Br$ to $+Br$, and due to the sneak suppression by diode D7 and resistor R3, no output will appear at terminal 44. During the period $t2$ to $t3$, a negative going power pulse is applied to terminal 43 and this applied pulse effectively causes diode D6 to cut off. During this interval of time a reverse current flows from ground through diode D7, through the power winding 41 and thence through resistor R4 to the source of negative potential $-V$. The value of this current is substantially $$\frac{V}{R4}$$

and R4 is so chosen that the current flow in the reverse direction through power winding 41 is sufficient to flip the core 40 during the time period $t2$ to $t3$ from $+Br$ back to $-Br$ in a counterclockwise direction. Thus, at time $t3$, the core 40 once more finds itself at its $-Br$ operating point 12 and a further positive going power pulse applied at terminal 43 during the time interval $t3$ to $t4$ will again merely flip the core 40 to its $+Br$ operating point 10 without effecting an output. Thus, in the absence of any other input signals the core is regularly flipped between $-Br$ and $+Br$ and back to $-Br$ without there being any output.

If we should now assume that an input pulse, as shown in FIGURE 5C, should be applied to input terminal 45 during the time period $t4$ to $t5$, this input pulse will cause current to flow through the winding 42 via diode D8 and will subject the core 40 to a supplemental magnetizing force. As will become apparent from an examination of the winding directions shown in FIGURE 4, the magnetizing force effected by coil 42 during the time $t4$ to t5 is in a direction opposite to that effected by the reverse current flow through coil 41 during this same time period. The magnetizing effect of the said reverse current flow through winding 41 is thereby effectively nullified and therefore at the end of the t4 to t5 time period the core remains at the operating point +Br. Application of a further positive going power pulse during the time t5 to t6 will therefore cause a substantial output to appear across load resistor RL, and at output terminal 44. If no further input pulse should be applied during the time t6 to t7, the reverse current flow through winding 41 will again cause the core to flip back to its −Br operating point, no output will appear during the time t7 to t8, etc. Thus, the arrangement shown in FIGURE 4 permits an output to appear across resistor RL during the application of a positive going power pulse only if an input were applied at the terminal 45 during the next preceding negative going power pulse.

One other design consideration should be noted. Current flow through the winding 41 will, in the absence of other circumstances, establish flux changes tending to induce a voltage in the signal input coil 42. In order to protect the input circuit connected to diode D8 against any interference from current flowing in the power winding 41, the signal winding 42 is returned to a positive voltage +E, as shown, which positive voltage is equal and opposite in value to the voltage induced or generated in it by current flowing in the power winding 41 when reverse current flows through the said winding 41.

Figure 6:
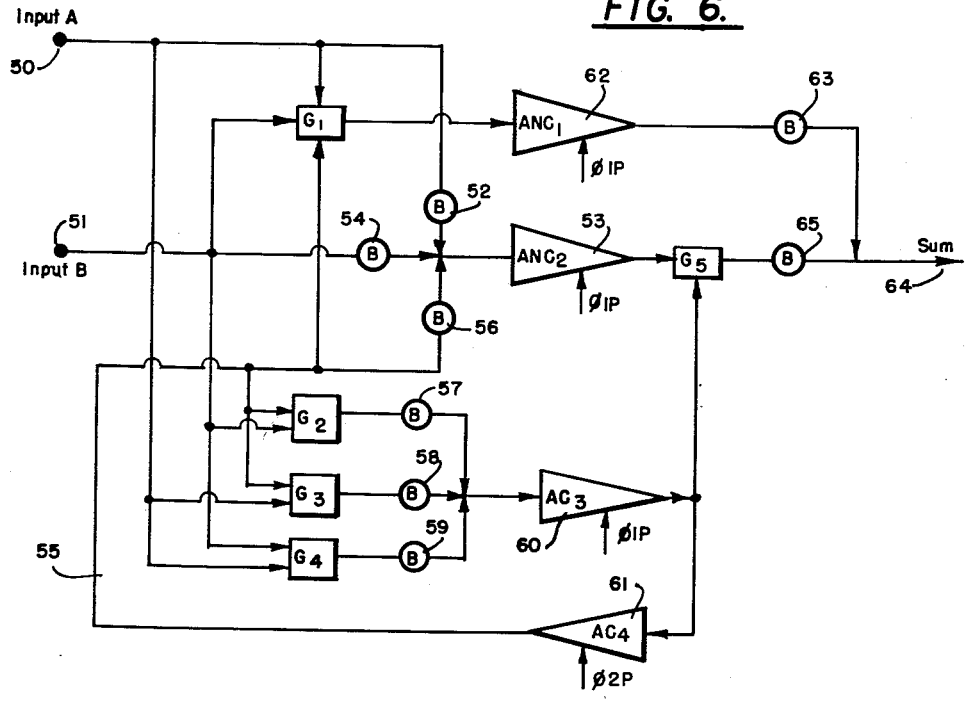
FIGURE 6 is a logical diagram of one form of serial adder for binary numbers in accordance with the present invention, and includes a legend descriptive of the symbols used therein.
Figure 6:
Figure 6:
Figure 6:
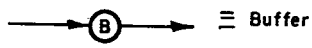
Figure 6:
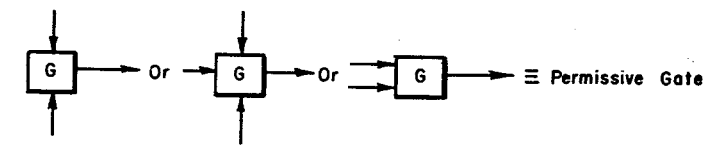

Referring now to FIGURE 6, it will be seen that the complementing and non-complementing amplifiers discussed previously may be utilized in accordance with one embodiment of the present invention to effect a serial adder for binary numbers. In the particular example shown, two trains of binary numbers designated Input A and Input B, may be coupled respectively to the two input terminals 50 and 51. The Input A terminal 50 is coupled directly to gates G1, G3 and G4, as shown, and is further coupled via a buffer 52 to the input of a non-complementing magnetic amplifier 53. Input B terminal 51 is similarly coupled directly to the gates G1, G2 and G4, and via buffer 54 to the input of the said non-complementing magnetic amplifier 53. As will subsequently appear, carry signals produced within the serial adder appear on the line 55, and these carry signals are coupled to the gates G1, G2 and G3 and once more via buffer 56 to the input of non-complementing magnetic amplifier 53. The outputs of the gates G2, G3 and G4 are buffed respectively via buffers 57, 58 and 59 to the input of the complementing amplifier 60 and the output of the said amplifier 60 is coupled both to the input of the gate G5 and to the input of a further complementing magnetic amplifier 61. The output of the said complementing magnetic amplifier 61 comprises the carry pulses appearing on the line 55 mentioned previously. The output of the gate G1 is coupled to the input of the non-complementing magnetic amplifier 62, and the output of amplifier 62 is in turn coupled via buffer 63 to a sum output terminal 64. Again, the output of the non-complementing magnetic amplifier 53 is selectively coupled via the gate G5 and the buffer 65 to the said sum output terminal 64.

Examining the arrangement shown in FIGURE 6, it will be seen that the gate G1 will be open only upon the simultaneous occurrence of an Input A, an Input B, and a carry pulse and therefore the non-complementing amplifier 62 will pass a pulse to the sum output terminal 64 for this particular pulse occurrence state only. Non-complementing amplifier 53 will in turn produce an output pulse whenever an input pulse is coupled thereto from Input A, or Input B or from the carry line 55. The output of the said amplifier 53 selectively appears at the sum output terminal 64 under the control of the gate G5, and G5 is in turn controlled in part by the output pulses from the complementing magnetic amplifier 60.

In the absence of an input to amplifier 60, the said amplifier 60 will produce output pulses which are coupled to the gate G5. However, whenever at least two of the three possible pulses are present, that is two of the Input A, Input B and carry pulses are present, at least one of the gates G2, G3 or G4 will be open causing a pulse to be passed to the input of the complementing amplifier 60, thereby inhibiting any output therefrom and keeping the gate G5 in a closed condition. The inhibition of an output from the complementing amplifier 60 will in turn permit the complementing amplifier 61 to produce an output representative of a carry signal.

In practice, and assuming that two input trains of four bits each are to be added serially, the relationship between the possible input pulse conditions, the results of the binary addition, and the state of the several gates may be represented in a table, as follows:

|      | Input A | Input B | Carry | Sum | New Carry | Gates Open |
|------|---------|---------|-------|-----|-----------|------------|
| I    | 1       | 1       | 1     | 1   | 1         | G1, G2, G3, G4 |
| II   | 0       | 1       | 1     | 0   | 1         | G2 |
| III  | 1       | 0       | 1     | 0   | 1         | G3 |
| IV   | 1       | 1       | 0     | 0   | 1         | G4 |
| V    | 1       | 0       | 0     | 1   | 0         | G5 |
| VI   | 0       | 1       | 0     | 1   | 0         | G5 |
| VII  | 0       | 0       | 1     | 1   | 0         | G5 |
| VIII | 0       | 0       | 0     | 0   | 0         |            |

The foregoing table indicates that the arrangement of gates is such, in respect to the several amplifiers and to the several input terminals, that the occurrence of two only of the three possible information pulses will cause one of the gates G2, G3 or G4 to be open, whereby the gate G5 is closed and the amplifier 61 produces a new carry output. Thus the occurrence of two only of the three possible information signals effects a sum of "0" at the sum output terminal 64 and a carry of "1" via the line 55. If one only of the three information signals is present, the output of amplifier 60 will not be inhibited and the gate G5 will accordingly be open while the output of amplifier 61 is inhibited. Thus, the appearance of one only of the three possible information signals effects a sum of "1" at the sum output terminal 64 and a carry of "0" on the carry line 55. If all three information signals occur simultaneously (Example I), the gate G1 will be opened causing the amplifier 62 to produce an output pulse and in addition, each of the gates G2, G3 and G4 will be opened whereby a pulse will be passed to the amplifier 60 to inhibit an output therefrom, and to permit in turn an output to occur from the complementing amplifier 61. Thus, the simultaneous occurrence of the three information signals results in a sum output of "1" at the sum output terminal 64, via the buffer 63, and in addition effects a carry signal of "1" on the line 55.

Finally, if none of the three possible information signals should appear for a given state of operation (Example VIII), no pulses will appear at the sum output terminal 64 nor on the carry line 55. The arrangement of gates and amplifiers shown in FIGURE 6 accordingly provides the electrical equivalent of the binary additions set forth in the preceding table and will as a result permit the serial addition of binary numbers.

Referring now to FIGURE 7, a first example of the operation of the circuit of FIGURE 6 has been presented in waveform representation and the example chosen is that of the addition of the binary number 1111 (fifteen), to the binary number 0001 (one), to effect a binary sum of 10000 (sixteen). As shown in FIGURE 7C, the number 1111 is presented to the Input A terminal and is represented by a series of four pulses appearing respectively during the time intervals t2 to t3, t4 to t5, t6 to t7, and t8 to t9. Similarly, the binary number 0001 is presented to the Input B terminal (FIGURE 7D) and is represented by a single pulse appearing during the time interval t2 to t3, and the absence of pulses during intervals t4 to t5, t6 to t7, and t8 to t9.

Examining now the several waveforms shown, and referring in particular to the circuit of FIGURE 6, it will be seen that during the time interval t2 to t3, pulses appear at both the Input A and Input B terminals. During this time interval therefore the gate G4 will produce an output. The output of gate G4 inhibits an output from the amplifier 60 during the time interval t3 to t4, and in addition, the pulses coupled via the buffers 52 and 54 to the input of non-complementing amplifier 53 causes the said amplifier 53 to produce an output pulse during the time interval t3 to t4. Because of the inhibition of the complementing amplifier 60, however, gate G5 is closed during the time interval t3 to t4, and no output will be coupled to the sum output terminal 64 during this time interval. The inhibition of an output from complementing amplifier 60 does, however, permit an output from the complementing amplifier 61 during the time interval t4 to t5, and therefore a carry pulse appears on the line 55 during this t4 to t5 time interval.

Thus, during the time interval t4 to t5, an Input A pulse and a carry pulse will be present on the appropriate lines whereby the gate G3 will produce an output during the said t4 to t5 interval. The output of gate G3 again inhibits an output from amplifier 60, preventing any output from the non-complementing amplifier 53 via the gate G5, and producing a carry output on the line 55 from the complementing amplifier 61 during the time interval t6 to t7. Again, therefore, during the interval t6 to t7 an Input A pulse and a carry pulse will appear on the appropriate lines whereby the sequence of operation described previously will be repeated. The same situation occurs for the time interval t8 to t9, and again therefore there will be no sum output at the terminal 64 during the time period t9 to t10.

During the time period t10 to t11, no inputs will appear at either the Input A or Input B terminals. Accordingly, the complementing amplifier 60 will not be inhibited and will produce an output pulse during the time t11 to t12, which output pulse is coupled to one input of the gate G5. A carry pulse appearing on the line 55 during the time interval t10 to t11 causes the non-complementing amplifier 53 to also produce an output pulse during the time interval t11 to t12. Gate G5 will therefore be opened during this interval t11 to t12 and will pass a pulse via the buffer 65 to the sum output terminal 64 during this time interval. The actual pulse configuration appearing at the sum output terminal 64 comprises a summation of the waveforms of FIGURES 7I and 7M and, as will be seen, the said summation does in fact comprise a pulse train representative of the binary number 00001 occurring respectively during the times t3 to t4, t5 to t6, t7 to t8, t9 to t10, and t11 to t12. This sum output train (reading from left to right) is representative of the binary number sixteen, which was the sum to be achieved by the device.

FIGURE 8 illustrates the operation of the circuit of FIGURE 6 in performing the addition of the binary number 1011 (eleven) to the binary number 0111 (seven) to effect a summation of 10010 (eighteen). Examining the several waveforms, it will be seen that during the time interval t2 to t3, a pulse appears at each of the Input A and Input B terminals. The gate G4 is therefore open during this time interval, passing an input to the amplifier 60 whereby the gate G5 is closed and a carry signal appears on the line 55 during the time interval t4 to t5. During the said time interval t4 to t5, pulses again appear at each of the Input A and Input B terminals and, in conjunction with the carry pulse appearing on the line 55 during this time interval, the several pulses cause each of the gates G1, G2, G3 and G4 to be opened. The opening of gate G1 couples a pulse to the input of the non-complementing magnetic amplifier 62 whereby an output pulse is coupled via the buffer 63 to the sum output terminal 64 during the time interval t5 to t6. The opening of the gates G2, G3 and G4 during the time interval t4 to t5, causes an input pulse to be coupled to the complementing amplifier 60 inhibiting any output therefrom during the time interval t5 to t6 whereby a carry pulse appears on the line 55 during the interval t6 to t7. During the said time interval t6 to t7, in addition to the occurrence of the said carry pulse, an Input B pulse appears at the terminal 51 and these two pulses serve to open gate G2 during this time interval. The opening of gate G2 again passes a pulse to the complementing amplifier 60 during the time interval t6 to t7 whereby the said amplifier 60 produces no output during the time interval t7 to t8, and the complementing amplifier 61 produces a still further carry output appearing on the line 55 during the time interval t8 to t9. Again, during this interval t8 to t9, in addition to the appearance of the carry pulse, a still further pulse appears on the Input A line whereby the gate G3 is opened during the time period t8 to t9, again inhibiting an output from amplifier 60 and thereby permitting a carry output from the amplifier 61 during the time interval t10 to t11.

Inasmuch as no pulses appear at either the Input A or Input B terminals, however, during the time interval t10 to t11, the complementing amplifier 60 is not inhibited in output during the time interval t11 to t12 and the output pulse from the said amplifier 60 during this time interval t11 to t12 inhibits a further carry output from the complementing amplifier 61 and further is coupled to one input terminal of the gate G5. During the time interval t10 to t11, the carry pulse appearing on line 55 is also coupled via buffer 56 to the input of non-complementing magnetic amplifier 53 whereby the said amplifier 53 also produces an output appearing at a further input of the said gate G5 during the time interval t11 to t12. Thus, the two inputs to the gate G5 cause the said gate to be opened during the time interval t11 to t12, whereby an output is coupled through the buffer 65 to the sum output 64 during this time interval. Once more the pulse sequence appearing at the sum output terminal comprises a summation of the pulse trains shown in FIGURE 8I and 8M and it will be seen that this summation comprises a train of pulses 01001 appearing during the time period t3 to t12. This summation pulse train (reading from left to right) is representative of the binary number eighteen which is the proper solution for a binary addition of the input trains chosen.

FIGURE 9 is representative of a possible schematic configuration constructed in accordance with the logic of FIGURE 6, and employing magnetic amplifiers of the type shown in FIGURES 2 and 4. It will be seen that the magnetic amplifiers utilizing the cores 70, 71, 72 and 73 respectively, correspond to the magnetic amplifier 62, 53, 60 and 61 of FIGURE 6. The several gates G1, G2, G3, G4 and G5 are also designated in FIGURE 9 as are the several input and output terminals and buffers.

While I have described a preferred embodiment of my invention, many variations will readily suggest themselves to those skilled in the art. In particular, the precise complementing and non-complementing magnetic amplifiers shown are merely illustrative and these amplifiers may in fact take a number of different forms which are all within the scope of the present invention.

In addition, the non-complementing magnetic amplifiers 62 and 53 may, if desired, be replaced by equivalent passive delay means whereby the required number of amplifiers is reduced. Still further modifications will be suggested to those skilled in the art, and it is to be understood that such modifications are meant to fall within the scope of the present invention as set forth in the appended claims.

Having thus described my invention, I claim:

1. A pulse type serial binary adder comprising first pulse producing means supplying a first input train of pulses representative of a first binary digital number, second pulse producing means supplying a second input train of pulses in phase with said first pulse train and representative of a second binary digital number, a first pulse type complementing magnetic amplifier selectively producing pulses at its output representative of a carry signal, a second pulse type complementing magnetic amplifier, first gating means for producing an input to said second complementing amplifier upon the simultaneous occurrence of pulses from at least two of said first train, said second train, and said carry signal, means for energizing said first and second complementing amplifiers with oppositely phased trains of regularly occurring power pulses respectively, the energizing pulses of said second complementing magnetic amplifier being in phase with said first and second pulse trains so that said second amplifier may be responsive to the application of pulses by said first and second input trains, means coupling the output of said second complementing magnetic amplifier to the input of said first complementing magnetic amplifier thereby to control the generation of said carry signal, a plurality of pulse type non-complementing magnetic amplifiers, a first one of said non-complementing amplifiers having its input coupled to said first pulse producing means, to said second pulse producing means, and to the output of said first complementing magnetic amplifier, means for energizing said non-complementing amplifier with a train of regularly occurring power pulses in phase with the power pulse train energizing said second complementing amplifier whereby said non-complementing amplifier is responsive to a signal pulse from at least one of said first pulse producing means, said pulse producing second means, and said first complementing amplifier for producing a further pulse at its output, second gating means responsive to simultaneous pulse signals from said second complementing magnetic amplifier and from said first non-complementing magnetic amplifier for selectively passing a sum output signal to an output terminal, third gating means coupled to said first pulse producing means, to said second pulse producing means, and to the output of said first complementing magnetic amplifier for passing a pulse upon the simultaneous occurrence of pulses from each of said first pulse producing means, said pulse producing second means, and said carry output of said first complementing amplifier, and a second non-complementing magnetic amplifier having its input coupled to the output of said third gating means and having its output coupled to said output terminal, said second non-complementing magnetic amplifier being energized by a train of regularly occurring power pulses in phase with the power pulse train energizing said second complementing amplifier, whereby said two non-complementing magnetic amplifiers and said second complementing magnetic amplifier are energized in phase with one another and out of phase with said first complementing magnetic amplifier.

2. The serial binary adder of claim 1 wherein said first gating means comprises a plurality of gates having their outputs coupled to the input of said second complementing magnetic amplifier, each of said plurality of gates being respectively opened to pass a signal in response to the simultaneous occurrence of a preselected pair of pulses from said first pulse producing means, and said second pulse producing means, and said carry thereby to pass an inhibiting pulse to the input of said second complementing magnetic amplifier, said preselected pair of pulses being different for different ones of said plurality of gates.

3. The serial binary adder of claim 2 in which each of said magnetic amplifiers includes a magnetic core of material exhibiting a substantially rectangular hysteresis loop.

4. The serial binary adder of claim 3 in which each of said magnetic amplifiers includes a power winding carried on its respective core, said trains of regularly occurring power pulses being coupled to the power windings of said magnetic amplifiers.

5. A pulse type serial binary adder comprising first means producing a first train of input pulses representative of a first binary digital number, second means producing a second train of input pulses in phase with said first train and representative of a second binary digital number, carry means comprising a complementing magnetic amplifier selectively producing pulses representative of a carry signal in the absence of inputs thereto, a first pulse type magnetic amplifier producing an output pulse at a sum output terminal in response to an input pulse supplied by first gating means which is activated by the simultaneous application of pulses from each of said first means, said second means, and said carry means, a second pulse type magnetic amplifier producing a predetermined characteristic output in response to an input pulse supplied by a second gating means which is controlled by the simultaneous application of at least two pulses from said first means, said second means, and said carry means, means coupling the output of said second magnetic amplifier to the input of said carry means to thereby selectively inhibit the production of said carry signal, a third pulse type magnetic amplifier producing an output pulse at third gating means in response to the application of a pulse from at least one of said first means, said second means, and said carry means to buffer circuit means coupled to the input of said third amplifier, said third gating means being activated to produce a pulse at said sum terminal in response to the simultaneous application of pulses from each of said second and third magnetic amplifiers, means for supplying in phase trains of regularly spaced power pulses to said first, second and third pulse type magnetic amplifiers, and means for supplying a train of regularly spaced power pulses to said carry means in out of phase relationship to said in phase power pulses, said in phase power pulses being in phase with said input pulses.

6. The serial adder of claim 5 in which said complementing amplifier comprising said carry means comprises a pulse type magnetic amplifier.

7. The serial binary adder of claim 5 in which said second magnetic amplifier comprises a pulse type complementing amplifier, said predetermined characteristic output comprising a no-pulse output state.

8. The serial adder of claim 7 in which said first and third magnetic amplifiers each comprise a pulse type non-complementing magnetic amplifier.

9. The binary adder of claim 5, wherein each of said gating means comprises an AND logic circuit.

10. The binary adder of claim 5, wherein said buffer circuit means comprises a diode cluster which operates as an OR logic circuit.

11. The serial adder of claim 5 in which each of said magnetic amplifiers includes a core of magnetic material exhibiting a substantially rectangular hysteresis loop.

12. A binary adder comprising first and second input terminals, a carry input terminal, an output terminal, first means including a pulse type non-complementing magnetic amplifier, said first means being responsive only to coincident signals at each of said first, second, and carry input terminals for producing a sum signal at said output terminal, second means including a pulse type non-complementing magnetic amplifier and gate means coupled to the output of said amplifier, said second means for selectively producing a further sum signal at said output terminal, enabling means including a first pulse type complementing magnetic amplifier for controlling said gate, said enabling means being responsive only to the application of a signal at no more than one of said first, second, and carry input terminals for opening said gate to pass pulses therethrough, and being further responsive only to coincident signals at more than one of said first, second, and carry input terminals for closing said gate to inhibit the passage of pulses therethrough, carry means comprising a second pulse type complementing magnetic amplifier having its output coupled to said first and second input terminals whereby said carry means normally provides a carry signal at said carry input terminal, and means coupling said enabling means to the input of said second pulse type complementing magnetic amplifier whereby said enabling means inhibits a carry output from said second complementing amplifier upon the application of a signal at no more than one of said first, second, and carry input terminals, said non-complementing amplifiers and said first complementing magnetic amplifiers being energized by trains of regularly spaced power pulses in phase with each other and the signals applied to said first and second input terminals, said second complementing magnetic amplifier being energized by a further train of regularly spaced power pulses out of phase with said first-mentioned trains of power pulses.

References Cited in the file of this patent

UNITED STATES PATENTS

| | | |
|---|---|---|
| 2,666,151 | Rajchman et al. | Jan. 12, 1954 |
| 2,715,997 | Hill | Aug. 23, 1955 |
| 2,806,648 | Rutledge | Sept. 17, 1957 |
| 2,843,317 | Steagall | July 15, 1958 |

OTHER REFERENCES

Haynes: Magnetic Cores as Elements of Digital Computing Systems, University of Illinois 1950, page 5 is relied on.

Proceedings of the IRE, Jan. 1952, "The Binac" (Eckert, Shaw, Weiner and Wilson), page 19, FIGURE 9-B is relied on.

Ramey: The Single Core Magnetic Amplifier as a Computer Element, Naval Research Laboratory Report #4030. 11 pages.